(12) United States Patent  
Khojastepour et al.

(10) Patent No.: US 11,743,163 B2  
(45) Date of Patent: *Aug. 29, 2023

(54) INTERACTIVE BEAM ALIGNMENT WITH DELAYED FEEDBACK

(71) Applicant: NEC Laboratories America, Inc., Princeton, NJ (US)

(72) Inventors: Mohammad Khojastepour, Lawrenceville, NJ (US); Shahram Shahsavari, Kanata (CA)

(73) Assignee: NEC Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/331,078

(22) Filed: May 26, 2021

(65) Prior Publication Data

US 2021/0376906 A1 Dec. 2, 2021

Related U.S. Application Data

(60) Provisional application No. 63/094,927, filed on Oct. 22, 2020, provisional application No. 63/062,542, filed on Aug. 7, 2020, provisional application No. 63/031,143, filed on May 28, 2020.

(51) Int. Cl.
  *H04L 43/12* (2022.01)
  *H04W 16/28* (2009.01)
  (Continued)

(52) U.S. Cl.
  CPC ........... *H04L 43/12* (2013.01); *H04B 7/0408* (2013.01); *H04B 7/0617* (2013.01);
  (Continued)

(58) Field of Classification Search
  CPC ....... H04L 43/10; H04L 43/12; H04B 7/0408; H04B 7/0617; H04B 7/0619; H04B 7/0695; H04W 16/28; H04W 72/046
  (Continued)

(56) References Cited

U.S. PATENT DOCUMENTS

2006/0046659 A1* 3/2006 Haartsen ............. H04B 17/382  
    455/67.11  
2007/0201566 A1* 8/2007 Solomon ........... H04L 25/03343  
    375/260

(Continued)

OTHER PUBLICATIONS

Hassanieh, Haitham, et al., "Fast Millimeter Wave Beam Alignment", InProceedings of the 2018 Conference of the ACM Special Interest Group on Data Communication. Aug. 7, 2018, pp. 1-14.

(Continued)

*Primary Examiner* — Sam K Ahn  
*Assistant Examiner* — Gina M McKie  
(74) *Attorney, Agent, or Firm* — Joseph Kolodka

(57) ABSTRACT

Methods for transmitting data include sending a first probing packet using a first scanning beam, selected from a set of scanning beams. Feedback about the first probing packet is determined. A second probing packet is sent using a second scanning beam, selected from the set of scanning beams based on the determined feedback about the first probing packet. Feedback about the second probing packet is determined. A data transmission beam is determined based on the set of scanning beams and the received feedback about the first probing packet and the second probing packet. Data is transmitted using an antenna that is configured according to the determined transmission beam.

19 Claims, 5 Drawing Sheets

(51) Int. Cl.
  *H04B 7/0408* (2017.01)
  *H04B 7/06* (2006.01)
  *H04W 72/044* (2023.01)

(52) U.S. Cl.
  CPC ......... *H04B 7/0619* (2013.01); *H04B 7/0695* (2013.01); *H04W 16/28* (2013.01); *H04W 72/046* (2013.01)

(58) Field of Classification Search
  USPC .......................................................... 375/267
  See application file for complete search history.

(56) References Cited

U.S. PATENT DOCUMENTS

2020/0037304 A1  1/2020  Khojastepour et al.
2020/0112360 A1* 4/2020  Krunz .................. H04B 7/0695

OTHER PUBLICATIONS

Abba Khalili et al. "On Optimal Multi-User Beam Alignment in Millimeter Wave Wireless Systems", arXiv:2001.06595v1, arXiv.org, Information Theory (cs.IT); Signal Processing (eess.SP), Jan. 2020 (https:arxiv.org/abs/2001.06595v1) sections I-III, and figure 1.
Marco Giordani et al., "A Tutorial on Beam Management for 3GPP NR at mmWave Frequencies", IEEE Communications Surveys & Tutorials, vol. 21, No. 1, Sep. 10, 2018 (pp. 179-181).

* cited by examiner

INTERACTIVE BEAM ALIGNMENT WITH DELAYED FEEDBACK

RELATED APPLICATION INFORMATION

This application claims priority to U.S. Provisional Patent Application No. 63/031,143, filed on May 28, 2020, U.S. Provisional Patent Application No. 63/062,542, filed on Aug. 7, 2020, and U.S. Provisional Patent Application No. 63/094,927, filed on Oct. 22, 2020, each incorporated herein by reference in its entirety.

This application is related to an application entitled "INTERACTIVE BEAM ALIGNMENT SYSTEM WITH DELAYED FEEDBACK," having attorney docket number 20017B, and which is incorporated by reference herein in its entirety.

BACKGROUND

Technical Field

The present invention relates to phased array antenna systems, and, more particularly, to adjusting the direction and with of a beam pattern using delayed feedback.

Description of the Related Art

To perform interactive beam alignment, a base station may receive feedback from a receiving station. This feedback may be used to precisely focus a beam pattern on the receiving station, making it possible to serve the receiving station even as it moves through space.

SUMMARY

A method for transmitting data includes sending a first probing packet using a first scanning beam, selected from a set of scanning beams. Feedback about the first probing packet is determined. A second probing packet is sent using a second scanning beam, selected from the set of scanning beams based on the determined feedback about the first probing packet. Feedback about the second probing packet is determined. A data transmission beam is determined based on the set of scanning beams and the received feedback about the first probing packet and the second probing packet. Data is transmitted using an antenna that is configured according to the determined transmission beam.

A method for transmitting data includes sending a plurality of probing packets using respective first scanning beams, selected from a set of scanning beams. Feedback about a first probing packet of the plurality of probing packets is determined after a non-zero delay interval has passed. A second probing packet is sent using a second scanning beam, selected from the set of scanning beams based on the determined feedback about the first probing packet. Feedback about the second probing packet and a remainder of the plurality of probing packets is determined. A data transmission beam is determined based on the set of scanning beams and the received feedback about the first probing packet, the second probing packet, and the remainder of the probing packets. A phased array antenna is configured according to the data transmission beam. Data is transmitted using the configured phased array antenna.

A method for transmitting data includes sending probing packets using respective first scanning beams, selected from a set of scanning beams. Feedback about a first probing packet of the probing packets is determined after a non-zero delay interval has passed by determining whether feedback has been received after the delay interval, setting a first bit responsive to a determination that a positive acknowledgement is received, and setting a second bit responsive to a determination that no acknowledgement is received. A second probing packet is sent using a second scanning beam, selected from the set of scanning beams based on the determined feedback about the first probing packet. Feedback about the second probing packet and a remainder of the probing packets is determined. A data transmission beam is determined based on the set of scanning beams and the received feedback about the first probing packet, the second probing packet, and the remainder of the probing packets. A phased array antenna is configured according to the data transmission beam. The set of scanning beams is configured based on prior knowledge about a communication channel between the phased array antenna and a receiving station. Data is transmitted using the configured phased array antenna.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In realistic scenarios, interactive beam alignment is performed in environments and with receiving stations where there is delay in delivering feedback. Feedback delay may be greater than one time slot, due to processing delays at the receiving station and the base station, propagation delays, and the structure of the communications protocol, whereby a receiving station may only be permitted to transmit during certain time slots. Performance can be substantially improved by accounting for these delays, for example by using the delay time productively to perform additional scanning.

Figure 1:
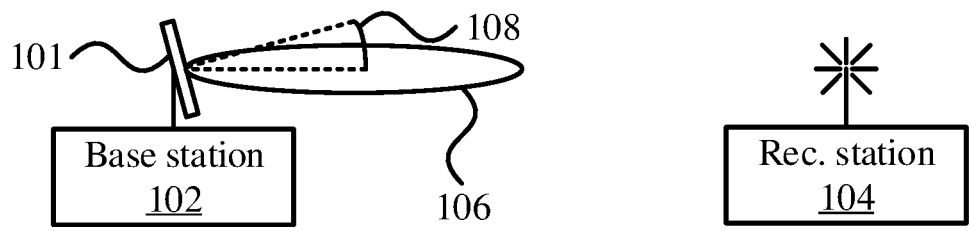
FIG. 1 is a block diagram of a communications system that includes a base station, in communication with a receiver station, that uses beam steering to direct information to the receiver station, in accordance with an embodiment of the present invention.

Referring now to FIG. 1, a transmission scenario is shown where a single base station 102 communicates with a single receiving station 104. The base station 102 has a phased array antenna system 101 that permits beam steering, while the receiving station 104 may have any appropriate antenna system, for example providing omnidirectional transmission and reception patterns. During beam alignment, the base station 102 attempts to minimize the width of an uncertainty region of a beam 106 that includes an angle of departure 108 for the receiving station 104, which may be measured relative to a normal angle of the phased array antenna system 101.

It may be assumed that the base station 102 is given a total of b packets for beam alignment, and assuming that the feedback for each transmitted beam alignment packet is received with a delay of d time slots. For example, feedback corresponding to the first beam alignment packet may be received at time slot 1+d. This formulation can accommodate both interactive (d=1) and non-interactive (d≥b) scenarios. The packets that are received by the receiving station 104 and their corresponding feedback at the base station 102 may be assumed to be error-free. Two cases for the scanning beams may be considered. In a first case, the base station 102 may use beams of any shape, while in the second case, the base station 102 is restricted to using only contiguous beams.

For contiguous scanning beams, the problem of finding optimal scanning beams can be divided into two sub-tasks: First, an optimal d-unimodal codebook may be determined, and then an optimal set of angular intervals may be determined. When combined with the codebook, the angular intervals provides an optimal set of scanning beams. The d-unimodal codebook provides fundamental results toward an optimal beam alignment process, and show that the number of possible data transmission beams should be maximized. A closed-form expression is provided below. Based on these analyses, the optimal scanning beams for the case of contiguous scanning beams, when d>1, provides contiguous uncertainty regions, which indicates that optimal data transmission beams are contiguous in these cases.

In the following examples, the base station 102 and the receiving station 104 may transmit using wavelengths in the millimeter scale, at exemplary frequencies between about 30 GHz and about 300 GHz. However, it should be understood that the present principles may include systems that transmit at any appropriate frequency. Additionally, although only a single base station 102 and a single receiving station 104 are discussed, for the sake of simplicity, it should be understood that any appropriate number of base stations 102 may be implemented in a given network, and that any appropriate number of receiving stations 104 may be associated with a given base station 102. Additionally, although only one angle of departure 108 is shown, it should be understood that multiple feasible angles may be available.

The phased array antenna system 101 may include an array of antenna elements, each of which may have a separate transmission path which provides selective amplification and phase shift for each of the antenna elements. By selecting a phase of each element, interference between the emissions of the elements can be selected to provide constructive interference along a beam path, and destructive interference along non-beam paths, thereby providing an effective amplification of the transmitted signal on the path that leads to the receiving station 104. In this manner, spatial multiplexing may be achieved, whereby independent channels may be transmitted to particular users, and interference with other used may be reduced.

The beam 106 may be modeled using a sectored antenna model that has a constant main-lobe gain and an angular coverage region that is the union of the angular intervals covered by the main lob. The impact of side-lobes may be ignored. Other models may be used for practical scenarios, where the beam pattern roll-off is not sharp.

Figure 2:
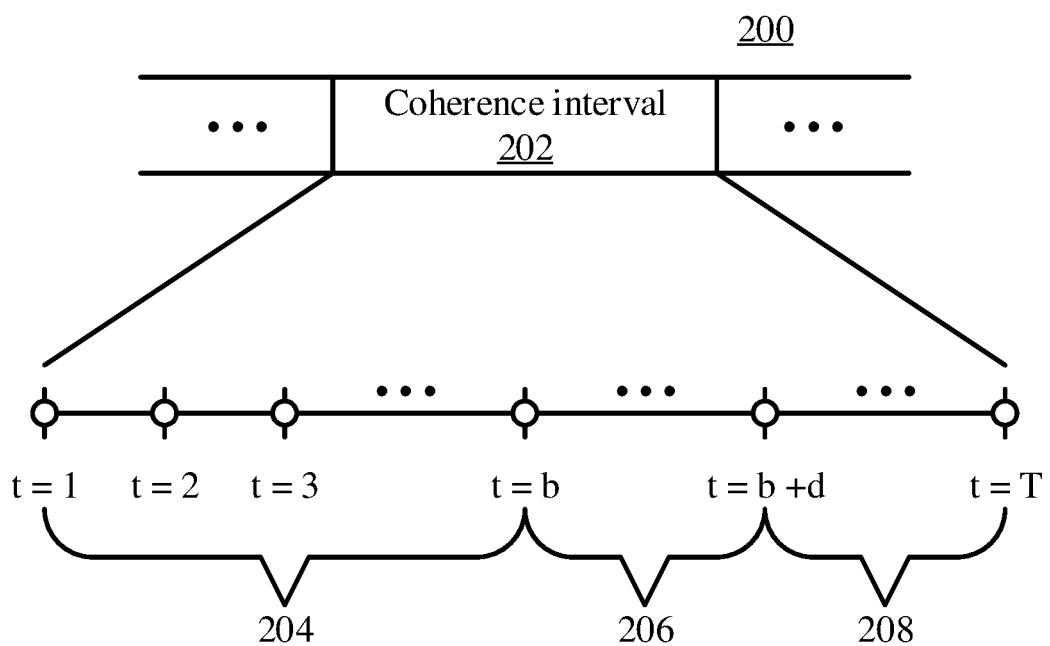
FIG. 2 is a diagram illustrating a coherence interval timeline, illustrating a period of time in which probing packets are sent, a delay interval, and a data transmission interval, in accordance with an embodiment of the present invention.

Referring now to FIG. 2, a time-slotted transmission system 200 is shown, having coherence intervals 202 that include T time slots t. The receiving station 104 may be stationary during each coherence interval 202. The coherence interval 202 may include three phases, including a probing phase 204, a waiting phase 206, and a transmission phase 208.

During the probing phase 204, the base station 102 may use b time slots to scan the angular space by sending probing packets in different directions. The order in which directions may be probed can be affected by feedback to previous probing packs, in previous coherence intervals 202. For example, if the receiving station 104 was located at an angle of departure 108 of $\Psi$ in a previous coherence interval, then the base station 102 may start by probing angles $\Psi \pm \alpha$, where $\alpha$ is a small angular range around the previous angle of departure 108.

Thus, the base station 102 may send probing packets at times t={1, . . . , b}. Upon receipt of each probing packet, the receiving station 104 may send a feedback packet. The feedback packet may include information, such as an identifying serial number and a received signal strength. This feedback packet is then received at the base station 102, after a delay of up to d time steps, for example due to processing delays that may be incurred at the base station 102 and at the receiving station 104. For the sake of simplicity, it may be assumed that the delay is fixed at d time steps. When there is no prior knowledge of the delay d, or if the value varies, an upper bound may be set for d, and scanning beams may then be designed based on the upper bound. However, this may result in sub-optimal scanning. In the case where there is no separate feedback channel, the base station 102 may need to switch back to a previous scanning beam to listen to the channel and to receive feedback corresponding to that scanning beam.

During the waiting phase 206, the base station 102 waits for d time slots to get the feedback on all of the probing packets. These d timeslots may be used for data transmission to any receiving stations 104 for which beam alignment has been previously performed, or can be used for other purposes, such as broadcasting, multicasting, or any other type of transmission. After receiving user feedback for the last probing packet—or determining that no such feedback has been received within the d timeslots, the base station 102 may process the feedback sequence and tailor the beam 106 to the used during the T—b—d timeslots of the transmission phase 208. These steps may then be repeated during a next coherence interval 202.

Non-interactive beam alignment is a special case of this process, where d≥b. In this case, the receiving station 104 does not respond to any of the probing packets during the probing phase 204, which means that the base station performs the scans without the benefit of feedback. In the case of d=1, feedback is received after one timeslot, for example the next timeslot after sending the probing packet.

Letting W be the angle of departure 108 of the spatial cluster of the channel from the base station 102 to the receiving station 104, an probability distribution function $f_\Psi(\psi)$ may be determined, where $\psi$ is an angle from normal of the phased array antenna system 101. This distribution reflects the prior knowledge about the angle of departure 108, which may correspond to a previously localized angle of departure.

Given b, d, and $f_\Psi(\psi)$, the width of the uncertainty region for the angle of departure 108 may be minimized. This is directly impacted by the scanning policy that is used for the probing period 204. A probing beam selection policy may be defined as a mapping which, given a scanning beam set $\mathcal{S}$, selects a scanning beam based on received feedback sequence to transmit the next beam alignment packet. A hierarchical scanning beam set may be defined as $\mathcal{S} = \{\mathcal{S}_i\}_{i \in [b]}$, and may be designed based on the distribution of random variable $\Psi$ to represent the receiving station's angle of departure 108, the number of beam alignment packets b, and the delay d. The probing beam selection policy at the $i^{th}$ timeslot selects one of the scanning beams in the set $\mathcal{S}_i$. If $i \leq d$, then no feedback has been received and $M_i = 1$. If $i > d$, there are multiple possibilities for the received feedback sequence, and so $M_i > 1$. The number of possible probing beams at each level $M_i = |\mathcal{S}_i|$ may be determined based on the number of feasible feedback vectors received at the $i^{th}$ timeslot, and is bounded by $2^i$.

The base station 102 chooses a data transmission beam, denoted by beam(a, $\mathcal{S}$), which is a function of the feedback a and the set of probing beams $\mathcal{S}$. The function captures different beam alignment strategies and is therefore a beam design policy function, returning uncertainty regions which include the angle of departure 108 of the receiving station 104. The set of all possible data transmission beams is denoted as $\mathcal{U} = \{u_k\}_{k \in [K]}$, where K is the size of the set of all possible transmission beams.

The scanning beams used to transmit the b beam alignment packets may be denoted as $\Phi^{(i)}$, where $i \in [b]$. When the channel of a user has a single dominant path, the beam design policy function that minimizes the angular uncertainty region of the angle of departure is given by:

$$\text{beam}(a, \mathcal{S}) = \cap_{i=1}^{b} \Theta_i(a, \mathcal{S}) \cap \text{supp}(\Psi)$$

where $\Theta_i(a, \mathcal{S}) = \Phi^{(i)}$ if $\psi \in \Phi^{(i)}$ (e.g., if the $i^{th}$ bit of a is set), and $\Theta_i(a, \mathcal{S}) = (0, 2\pi] - \Phi^{(i)}$ otherwise, and where $\text{supp}(\Psi)$ is a support function.

In this formulation, where there is only a single dominant path, there is a single angle of departure 108 that is associated with the receiving station 104, such that a positive feedback for the beam $\Phi^{(i)}$ means that the angle of departure 108 is inside the beam, and a negative feedback means that the angle of departure 108 is in the beam's complement, which is $(0, 2\pi] - \Phi^{(i)}$.

Given the set of possible data transmission beams $\mathcal{U}$, the expected width of the calculated uncertainty regions of the receiving station 104 may be expressed based on the policy function as:

$$\overline{U}(\mathcal{S}) = \mathbb{E}[|\text{beam}(a, \mathcal{S})|]$$

$$= \sum_{k=1}^{K} |u_k| \int_{\psi \in u_k} f_\Psi(\psi) d\psi$$

where $u_k = \text{beam}(a, \mathcal{S})$ for $\psi \in u_k$ and the expectation is taken over by the distribution $f_\Psi(\psi)$. The notation $|u_k|$ may be the Lebesgue measure of $u_k$, which may correspond to the total width of the intervals in cases where $u_k$ is the union of a finite number of intervals. The dependence of $\overline{U}$ on $\mathcal{S}$ comes from the expectation, which is a function of the set of data transmission beams $\mathcal{U}$.

The codebook S may be designed given the number of beam alignment packets b, the delay d, and the prior angle of departure information $f_\Psi(\cdot)$ to minimize the expected width of a data transmission beam. The design of the codebook may be described as the solution of the following optimization problem:

$$\{S_i^*\}_{i \in [b]} = S^* = \arg\min_{S} \overline{U}(\mathcal{S})$$

with $\overline{U}^* = \overline{U}(\{\mathcal{S}_i^*\}_{i \in [b]})$. The optimal scanning beams from this optimization problem are the ones that can generate a partition $\{u_k^*\}_{k=1}^{K} = \arg\min_{u_k, k \in [M]} \sum_{k=1}^{K} |u_k| \mathbb{P}(\Psi \in u_k)$ such that $|u_k| \geq 0$.

For non-contiguous beams, also known as composite beams, then b composite scanning beams can be found, such that there are $2^b$ data transmission beams. Performance in such a case is independent from the value of d. In addition, using a set of scanning beams designed for a case where d>b, the beam set can be used for any values of d to achieve the same performance. Therefore, optimal performance can be obtained using any value for d.

For contiguous beams, the angular region $(0, 2\pi]$ can be partitioned into a set of contiguous intervals. The beam can be specified by a binary set, where a $j^{th}$ bit indicates whether or not the $j^{th}$ interval in the partition is included in the beam. If a beam is contiguous, its corresponding binary set would have a specific realization, which can be categorized using unimodal sets.

As used herein, a binary loop is a cyclic ordered set of binary elements. A binary loop may be unimodal if there is only one position where the value of an element in this position is less than or greater than the value of the immediately preceding element. Given a delay d, an extension to this definition can be used. A binary codebook C(b, d) with codewords of length b is d-unimodal if there exists a characteristic loop with the following properties: 1. It includes all elements of the codebook, possibly with repetition, in a particular cyclic order; 2. For any i such that $i \leq d$, the loop created by the $i^{th}$ bits of the codewords in the characteristic loop is unimodal; and 3. For any i such that i>d, if one creates cyclic subsets of the characteristic loop by grouping the elements with same prefix of length i−d while preserving the original cyclic order in the characteristic loop, the elements in the $i^{th}$ position of the codewords in each subset create a unimodal binary loop. The code size is then the number of codewords in C, denoted by |C|.

A characteristic loop of a codeword is not unique and may contain repetition of the same codewords. For example, repetition of the same codeword consecutively always generated another characteristic loop. Hence, a minimal characteristic loop may be defined as one which does not contain any consecutive repetitions. Yet, a minimal characteristic loop may still contain repetitions that are not consecutive. For example, the codebook C={11,01,10}, with the characteristic loop $\mathcal{L}=\odot\{11,01,11,10\}$, which is minimal but contains repetition. The notation $\odot$ is used herein to indicate a loop.

Since each beam in a probing beam codebook $\mathcal{S}$, having N probing beams, is contiguous, it can be determined using two angles. The partition of $(0,2\pi]$ created by these angles may be denoted as the set $\mathcal{I}=\{I_\ell\}_{\ell\in[N]}$, where the intervals are positioned such that the endpoint of each interval is the starting point of the next. This condition imposes cyclic order on the set $\mathcal{I}$ and makes sure it is a loop.

Each of these intervals has a corresponding feedback sequence, and there may exist multiple intervals with the same feedback sequence. It is also possible that some intervals may be trivial and have zero length. By removing the trivial intervals, and then replacing each element of the set $\mathcal{I}$ with its corresponding feedback sequence, the resulting loop is a characteristic loop of a d unimodal codebook. Moreover, given a minimal characteristic loop $\mathcal{L}$ and an angular interval set $\mathcal{I}$ of the same cardinality, one can use the following construction to form a hierarchical probing beam codebook $\mathcal{L}$ having feedback sequences from the d-unimodal codebook with the minimal characteristic loop $\mathcal{L}$.

Given a minimal characteristic loop $\mathcal{L}$, and a contiguous angular interval set $\mathcal{I}$ of the same cardinality, a hierarchical probing beam set $\mathcal{S}=\{\mathcal{L}_i\}_{i\in[b]}$ may be constructed as follows. For i≤d, a binary loop may be formed by considering the $i^{th}$ element of the codewords in the characteristic loop, the set $\mathcal{L}_i$ including one scanning beam, which is the union of the intervals in $\mathcal{I}$ having a corresponding 1 bit in the formed binary loop. For i>d, the characteristic loop is divided into subsets of codewords that have the same prefix of length i−d. Given that there are $M_i$ such subsets, the set $\mathcal{L}_i$ would include $M_i$ probing beams, one for each possible feedback sequence of length i−d. To find a probing beam that corresponds to a subset, a binary sequence from the $i^{th}$ element of the codewords in that subset is formed. Then, the probing beam may be the union of all the intervals in $\mathcal{I}$ that have an equivalent bit of 1 in the sequence, or that fall in between these intervals.

Figure 3:
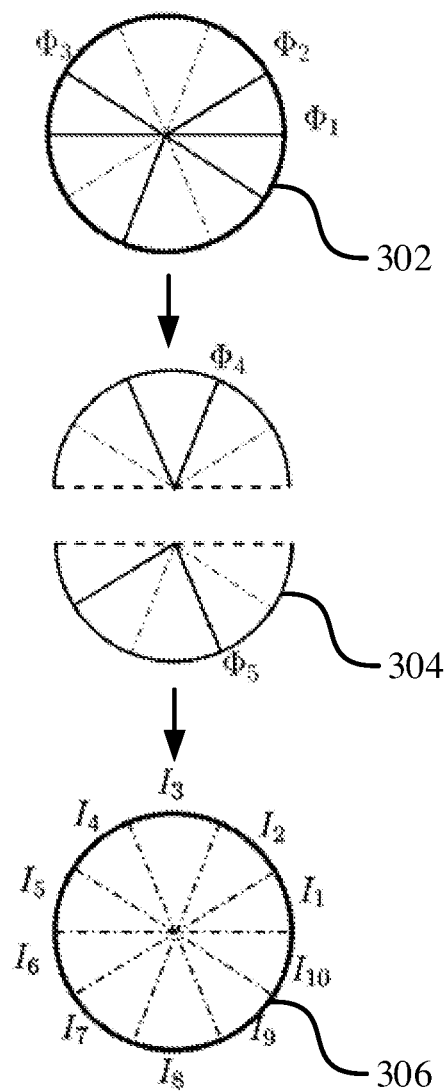
FIG. 3 is a diagram illustrating a selection of scanning beams, in accordance with an embodiment of the present invention.

Referring now to FIG. 3, an example is shown for scanning beams where b=3 and d=4. A first set 302 shows a set of overlapping beams $\Phi_1$, $\Phi_2$, and $\Phi_3$. Notably, the first beam $\Phi_1$ splits the set 302 in half. Thus, a response to a packet sent on $\Phi_1$ leads to consideration of a second set of options 304, where a positive feedback may indicate that the receiving station 104 is within the upper half of the beam options and a negative feedback may indicate that the receiving station 104 is within the lower half of the beam options. Based on this feedback, the second set 304 identifies additional beams $\Phi_4$ and $\Phi_5$. The third view 306 shows a set of different beam intervals I, where the beams $\Phi$ are made up of unions of different beam intervals. For example:

$\Phi_1=\cup\{I_1,I_2,I_3,I_4,I_5\}$ $\Phi_2=\cup\{I_8,I_9,I_{10},I_1\}$ $\Phi_3=\cup\{I_5,I_6,I_7,I_8,I_9\}$ $\Phi_4=I_3$ $\Phi_5=\cup\{I_7,I_8\}$ There exists a one-to-one correspondence between any given $\mathcal{S}$ and d-unimodal codebooks C and between the corresponding regions $\mathcal{U}$ and the minimal characteristic length $\mathcal{L}$. In this example, $\mathcal{S}=\{\mathcal{S}_1,\mathcal{S}_2,\mathcal{S}_3,\mathcal{S}_4\}$, where $\mathcal{S}=\{\mathcal{S}_i\}_{i\in[4]}$ for $i\in\{1,2,3\}$ and $\mathcal{S}_4=\{\Phi_4,\Phi_5\}$. Also, $\mathcal{U}\{U_j\}_{j=1}^9$, where $U_j=I_j$ for $j\in[10]\backslash 2$ and $U_2=\cup\{I_2,I_4\}$. The corresponding minimal characteristic loop $\mathcal{L}$ is then $\mathcal{L}=\odot\{1100,1000,1001,1000,1010,0010,0011,0111,0110,0100\}$. The minimal characteristic loop has repetition of the codeword 1000, which corresponds to non-contiguous uncertainty region $U_2$.

Sets $\mathcal{S}_1$, $\mathcal{S}_2$, and $\mathcal{S}_3$ are trivial. To form $\mathcal{S}_4$, $\mathcal{L}$ may be divided into subsets of coderwords with the same prefix of length 1, which leads to sets $\odot\{1100,1000,1001,1000,1010\}$ and $\odot\{0010,0011,0111,0110,0100\}$. From the first set, at position i=4, only the third codeword has a 1. Therefore, $\Phi_4=I_4$. Similarly, $\Phi_5=I_7\cup I_8$, which gives the exact scanning beams used in the example. This illustrates the one-to-one correspondence.

For any given $\mathcal{S}$, there exists a pair ($\mathcal{L}$, $\mathcal{I}$) which can be used to construct the scanning beam set $\mathcal{S}$. As a result, to find the optimal scanning beam set $\mathcal{S}*$, the problem can be expressed as finding the optimal pair ($\mathcal{L}*$, $\mathcal{I}*$) that produces $\mathcal{S}*$.

To find the optimal minimal characteristic loop $\mathcal{L}*$, a d-unimodal codebook may first be generated. A parent-child hierarchy can be defined between C(b, d) and C(b−1, d), which can be used to generate codebooks of any length. For a C(b, d) codebook with characteristic loop $\mathcal{L}$(b, d), the loop containing the prefix of length b−i of all the codewords in the loop is a characteristic loop that defines a parent codebook C(b−i, d) of order i. The parent codebook of order 1 is referred to herein as the parent codebook. Given a codebook, its corresponding parent codebook is unique. However, a parent codebook can generate different child codebooks. Given $\mathcal{L}$(b, d), the corresponding C(b, d) is the union without repetition of the codewords in $\mathcal{L}$(b, d).

To generate a feasible minimal characteristic loop $\mathcal{L}$(b, d) for the codebook C(b, d), if b≤d, then $\mathcal{L}$(b−1, d) is formed for C(b−1, d). Each element of $\mathcal{L}$(b−1, d) is repeated three times in their positions to create $\tilde{\mathcal{L}}$. Then, a unimodal binary loop with the same length as $\tilde{\mathcal{L}}$ is created and appended to $\tilde{\mathcal{L}}$, by concatenating each of its elements to the last bit of the corresponding codeword in $\tilde{\mathcal{L}}$. The consecutive repetitions may be removed to form the loop $\mathcal{L}$(b, d).

If b>d, then after creating $\mathcal{L}$(b−1, d) for the codebook C(b−1, d), $\mathcal{L}$ may be divided to cyclic subsets by grouping the elements with the same prefix of length b−d, while preserving the cyclic order. Then the same procedure as above may be applied to each subset to form $\mathcal{L}$(b, d) by inverting the grouping procedure.

While creating the subsets, there may be cases that cause consecutive repetition of elements. For those cases, each of the consecutive repetitions may be treated as distinct elements, meaning that none should be removed.

Referring again to FIG. 3, with $\mathcal{L}(4,3)=\odot$ {1100,1000, 1001,1000,1010,0010,0011,0111,0110,0100}, the minimal characterization loop is $\mathcal{L}(3,3)=\odot$ {110,100,101,001,011, 010}, and the above construction can be used to produce $\mathcal{L}(4,3)$. The codewords may be grouped into subsets with the same prefix of length 1, so $\mathcal{L}_1=\odot$ {110,100,101} and $\mathcal{L}_2=\odot$ {001,011,010}. Repeating each element in its place leads to $\tilde{\mathcal{L}}_1=\odot$ {110,110,110,100,100,100,101,101,101} and $\tilde{\mathcal{L}}_2=\odot$ {001,001,001,011,011,011,010,010,010}. Then the unimodal binary sets $a_{p,1}$={0,0,0,0,1,1,0,0,0} and $a_{p,2}$={0,1,1,1,0,0,0,0,0} may be appended to the codewords of the first and second subsets, respectively. After removing repetitions and inverting the grouping, the original $\mathcal{L}(4,3)$ is generated.

Assuming that the length of a unimodal binary loop is fixed, it can be identified by two positions, that of the first bit which is flipped (denoted by $i_f$) and that of the bit whose next bit is flipped again (denoted by $i_l$). The case where the code is all ones or all zeroes is denoted by $i_f=i_l=\infty$.

Each appended binary loop $\mathcal{P}$ can at most increase the number of codewords in codebook C(b, d) and its corresponding minimal characterization loop $\mathcal{L}(b, d)$ by two, given that there are at least two distinct codewords in the corresponding subset. Otherwise it can only increase the number of codewords in the codebook and its corresponding minimal characterization loop by 1 and 2, respectively. Given values b>1 and d>1, the following construction can be used to create a maximum cardinality minimal characterization loop and codebook.

Starting from i=1, the minimal characterization loop $\mathcal{L}(1, d)$ is set to $\odot$ {1,0}, and the codebook C(1, d) is set to {1,0}. The value of i is incremented until i=b. For d=1, the subsets for each i are formed. Then, a unimodal binary loop is appended, in which $i_f=i_l$ with mod($i_f$, 3)=2 to each subset. For d>1, when i≤d, there exists only one subset for which use a unimodal binary loop with $i_f$ and $i_l$ falling on different codewords. For i>d, the minimal characterization loop $\mathcal{L}(i-1, d)$ groups the codewords into subsets with the same prefix of length i−d. Then, for each subset, a unimodal binary loop may be formed with $i_f$ and $i_l$ being selected as follows. Any codewords having a unique prefix of length i−d+1 are found, and $i_f$ and $i_l$ are set to fall on the second repetition of these codewords. Otherwise, they are set to fall on second repetitions of any arbitrary codeword.

In the following, M(b, d) may denote the maximum cardinality for C(b, d) which is a d-unimodal binary code of length b, and N(b, d) may denote the maximum length for the minimal characterization loop $\mathcal{L}(b, d)$. When d=1:

$$M(b,1)=2^b, N(b,1)=2^{b+1}-2$$

When d≥2:

$$M(b, d) = N(b, d)$$
$$= \begin{cases} M(b-1, d) + 2M(b-d, d) & b > d, \\ 2b & b \le d \end{cases}$$

Referring again to FIG. 2, a previous example showed that $\mathcal{L}(3,3)=\odot$ {110,100,001,011,010}. This is already a maximum cardinality minimal characterization loop for b=3 and d=3. The above procedure may be used to obtain a maximum cardinality minimal characterization loop $\mathcal{L}^*(4, 3)$ and codebook C*(4,3). Similar to the example above, the codewords may be grouped into subsets with the same prefix of length 1, and each element may be repeated in place three times. This provides $\tilde{\mathcal{L}}_1=\odot$ {110,110,110,100,100,100,101, 101,101} and $\tilde{\mathcal{L}}_2=\odot$ {001,001,001,011,011,011,010,010, 010}. The unimodal binary sets $\mathcal{P}_1=\odot$ {0,0,0,0,1,1,1,0,0} and $\mathcal{P}_2=\odot$ {0,1,1,1,0,0,0,0,0} satisfy the conditions for constructing a maximum cardinality codebook. By appending $\mathcal{P}_1$ and $\mathcal{P}_2$ to the codewords of the first and second subset, respectively, removing repetitions and inverting the grouping procedure, the outcome is $\mathcal{L}^*(4,3)=\odot$ {110,1000, 1001,1011,1010,0010,0011,0111,0110,0100}. This minimal characterization loop has the same length of the original minimal characterization loop, but has a new codeword 1011, which was not present in the original.

The maximum cardinality minimal characterization loop for d>1 does not have any repetitions. This can be used to show that the optimal data transmission beams are contiguous for d>1. To find an optimal solution $\mathcal{S}^*$ set to the problem of $$\{\mathcal{S}^*_i\}_{i\in[b]}=\mathcal{S}^*=\underset{\mathcal{S}}{\arg\min}\ \overline{U}(\mathcal{S}),$$

it is sufficient to use a max cardinality minimal characteristic loop $\mathcal{L}$ of d-unimodal cookbooks to design $\mathcal{S}^*$.

As a result, there exists a set of contiguous data transmission beams for d>1 that provide optimal performance. By using contiguous scanning beams, the optimal data transmission beams are also contiguous. Using these results, an upper bound and lower bound on the minimum expected bandwidth for data transmission can be determined. The optimal value of the objective function $\overline{U}^*$ in the optimization problem, when contiguous scanning beams are used, is bounded as:

$$\frac{2^{h(\Psi)}}{M(b,d)} \le \overline{U}^* \le \frac{\text{supp}(\Psi)}{M(b,d)}$$

The search for an optimal solution may thus be broken into two steps. First, based on d and b, a maximum cardinality minimal characterization loop $\mathcal{L}^*$ may be constructed. Next, a set of contiguous angular intervals $\mathcal{I}^*$ may be determined, which, after combination with $\mathcal{L}^*$, form scanning beam set $\mathcal{S}^*$.

To find the set of contiguous angular intervals $\mathcal{I}= \{I_j\}_{j=1}^{N(b,d)}$, where $I_j=(x_k, x_j+1]$, the set of data transmission beams $\mathcal{U}=\{u_k\}_{k=1}^{M(b,d)}$. The Angular interval of $U_k$ is equal to the union of the angular intervals in $\mathcal{I}$ having a corresponding codeword in $\mathcal{L}$ that is the $k^{th}$ codeword in C. The optimal $x_j$, j∈[N(b, d)], may be determined by rewriting the optimization as:

$$\underset{x_j, j\in[N(b,d)]}{\arg\min} \sum_{i=1}^{M(b,d)} \left( \sum_{\{j\}\{I_j\in U_i\}} (x_{j+1}-x_j) \right) \int_{u_i} f_\Psi(x)dx$$

For d>1, as each $u_k$ is contiguous, the optimization reduces to:

$$\operatorname*{argmin}_{x_j, j \in [M(b,d)]} \sum_{j=1}^{M(b,d)} (x_{j+1} - x_j) \int_{x_j}^{x_{j+1}} f_\Psi(x) dx$$

An optimal set of scanning beams can be generated with a max cardinality codebook and an optimal angular interval set. Although the optimal data transmission beams for the case of d=1 are not contiguous in general, one can always find an optimal set of scanning beams that correspond to contiguous transmission beams, when the prior is uniform with an arbitrary support. Moreover, if the contiguity of the data beams is enforced for the case of d=1, and if M(b, 2)=2^b, then d=2 is the same as d=2. The optimal performance for the case of d=1 with the constraint of contiguous data beams is the same as optimal performance for the case of d=2, with the difference that the beam alignment duration is one time slot shorter.

In an alternate formulation, $s_i$ may denote a scanning beam and $a_i \in \{0,1\}$ may denote the feedback received for the $i^{th}$ beam alignment packet. Since there are multiple choices for $s_i$ based on the feedback received prior to the $i^{th}$ time slot, to model the set of scanning beams, a hierarchical beam set $S=\{S_i\}_{i \in [b]}$ may be used, where $\mathcal{S}_i$ denotes the set of all possible scanning beams for the $i^{th}$ beam alignment packet. By the $i^{th}$ time slot, the base station 102 will have received the feedback sequence corresponding to the beams $s_j$, for j≤i−d. The set $\mathcal{S}_i$ may include a beam for each possible feedback sequence $\{a_j\}_{j \le i-d}$, which may be used to transmit the $i^{th}$ beam alignment packet upon reception of the feedback sequence. Thus $s_i$ and $a_i$ are fully determined, given $\mathcal{S}$ and ψ, so the pair ($\mathcal{S}$, ψ) may be used instead of ($s_1$, $a_t$).

The problem of minimizing the expected width of the uncertainty region for the angle of departure may be represented as $$\mathcal{S}^* = \operatorname*{argmin}_s \mathbb{E}_\Psi[|\mathrm{beam}(\mathcal{S}, \Psi)|],$$

where the expectation is taken over the distribution $f_\Psi(\psi)$.

The set of possible uncertainty regions may be expressed as $\mathcal{U} = \{u_k\}_{k \in [K]}$, which may be defined as the range of the function beam($\mathcal{S}$, Ψ), where K is the number of possible uncertainty regions less than or equal to $2^b$. Then $u_k$= beam($\mathcal{S}$, Ψ) for ψ∈$u_k$. Hence, the objective may be written as:

$$U(\mathcal{S}) := \mathbb{E}_\Psi[|\mathrm{beam}(\mathcal{S}, \Psi)|] = \sum_{k=1}^{K} |u_k| \int_{\psi \in u_k} f_\Psi(\psi) d\psi$$

The notation $|u_k|$ is the Lebesgue measure of $u_k$, which corresponds to the total width of the intervals in cases where $u_k$ is the union of a finite number of intervals.

The scanning beams in $\mathcal{S}$ partition the interval (0,2π] into a set of contiguous intervals called component beams. The component beams may be derived by sorting the endpoints of the scanning beams in $\mathcal{S}$, at which point each interval between two consecutive endpoints is a component beam. Since the component beams are contiguous, their positions on the circle can be used to form a loop $\mathcal{J}$ of component beams, being a cyclically ordered set of elements.

When the channel of a receiver station 104 has a single dominant path, such that there is zero or negligible multipath, the angular uncertainty region of the angle of departure, based on a received feedback sequence s is given by:

$$B(s) = \cap_{i=1}^{b} \Theta_i(s)$$

where $\Theta_i(s) = \Phi_i$ if a positive acknowledgement is received for the scanning beam i, and $\Theta_i(s) = \mathcal{D} - \Phi_i$ otherwise. The feedback sequence may be defined as a binary sequence $s = (s_1, s_2, \ldots, s_b)$, corresponding to the b probing packets, where the $i^{th}$ position has a value of zero or one, corresponding to negative acknowledgement and positive acknowledgement feedback, respectively. The domain $\mathcal{D}$ may be as large as [0,2π). The set $\{\Theta_i(s)\}_{i=1}^{b}$ may be determined based on the feedback sequence s.

This formulation uses the fact that, when there is only one path, then there is a single angle of departure associated with the receiver station 104, the presence of a positive acknowledgement for the beam $\Phi_i$ means that $B(s) \in \Phi_i$, and a negative acknowledgement means that $B(s) \in (0, 2\pi] - \Phi_i$.

The scanning beam policy may choose scanning beams for b>d based on the uncertainty region given by B(s), which, in turn, is a function of the received feedback sequence. The data transmission beam policy may also use the same computed B(s) after reception of the last feedback bit, and may choose a beam which exactly covers the uncertainty region. The notation $\mathcal{P}$ indicates a combined policy, including both scanning beam and data transmission beam policies. For a data transmission beam policy that covers the uncertainty region B(s), assuming that the user channel has only one path, it can be shown that $u_k$s partitions the search domain $\mathcal{D}$, such that $u_k \cap u_{k'} = \emptyset$, ∀k, k' and $\cup_{k=1}^{M} u_k = \mathcal{D}$.

Given the set of data transmission beams, $\mathcal{U} = \{u_k\}_{k=1}^{M}$, the expected width of the calculated uncertainty region of a receiver station 104 may be based on policy $\mathcal{P}$ as:

$$\overline{U}(\mathcal{B}) = \mathbb{E}[|B(s)|] = \sum_{k=1}^{M} |u_k| \int_{\varphi \in u_k} f_{\Psi_j}(\varphi) d\varphi$$

where $u_k = B(s)$ for ψ∈$u_k$, and where the expectation is taken over the feedback sequence s, which is a function of the angle of departure. The term $|u_k|$ is the Lebesgue measure of $u_k$, which corresponds to the total width of the intervals in the case where $u_k$ is the union of a finite number of intervals. The dependence of $\overline{U}$ on $\mathcal{B} = \{\Phi_i\}_{i=1}^{b}$ comes from the expectation, which is a function of the set of data transmission beams created by $\mathcal{B}$.

A set of b scanning beams $\mathcal{B}$ may be designed to minimize the weighted average of the expected width of uncertainty ranges for the receiving station(s) 104. This goal may be expressed as the following optimization problem:

$$\mathcal{B} = \operatorname*{argmin}_{\{\Phi_i\}_{i=1}^{b}} \overline{U}(\{\Phi_i\} b_i = 1)$$

The term U* may be defined as the optimal objective value in this optimization problem. The optimal scanning beams are the ones that can generate an optimal partition $\{u_k^*\}_{k=1}^{M}$, such that:

$$\{u_k^*\}M_{k=1} \operatorname*{argmin}_{u_k, k \in [M]} \sum_{k=1}^{M} |u_k| \mathbb{P}(\Psi \in u_k)$$

Such that $|u_k| \geq 0$.

A data transmission beam policy may be used to assign a data transmission beam to a received feedback sequence s. For example, the calculated uncertainty region based on a scanning beam policy for a virtual index b+1, which would otherwise be outside the bound for selecting an actual scanning beam, may be used to define a data transmission beam policy. The data transmission beam policy simply calculates the remaining uncertainty region after the reception of the entire feedback sequence s.

Thus, a set of scanning beams, a scanning beam policy, and a data transmission beam policy are determined to minimize the expected beam width of the transmitted data transmission beam. Such minimization considers the scanning interval and the prior knowledge, for example the distribution, of the receiving station's angle of departure. A feedback sequence may be regarded as valid if, and only if, there is a possible path realization which leads to such a feedback sequence. The number of valid sequences may therefore be less than the $2^b$ maximum number of feedback sequences for a sequence of size b.

An interactive beam alignment problem, with distribution function $f(\cdot)$ for the angle of departure, having b scanning beams, a feedback delay d, and a policy $\mathcal{P}$ for scanning beams and data transmission beams is expressed as IBA($f$, b, d, $\mathcal{P}$). As noted above, a loop is an ordered sequence of elements around a closed trajectory, without having an absolute location, but respecting relative location and direction in the loop. A loop of size n includes n elements, represented as $a_i$, with i=1, . . . , n, such that $a_i$ immediately precedes $a_{i+1}$ for $1 \leq i \leq n-1$, and $a_n$ immediately precedes $a_0$. Similarly, the element $a_{i+1}$ immediately succeeds $a_i$ for $1 \leq i \leq n-1$, and $a_0$ immediately succeeds $a_n$. A circular shift of the elements does not affect the loop.

For non-contiguous beams, by using a simple scanning beam policy that picks a different scanning beam in each time slot, $2^b$ data transmission beams may be generated for each possible feedback sequence. It is also possible to generate $2^b-1$ data transmission beams for all feedback sequences other than the all-zero feedback sequence. The solution of such non-contiguous scanning beams may be found as described in greater detail below.

When practical constraints involve the use of contiguous beams for the scanning beams, it can be noted that each scanning beam $\Phi_i$ that is contiguous can be represented by an angular interval $[\phi_{2i-1}, \phi_{2i}]$. A scanning beam policy selects a beam at each time slot in the scanning interval. The term $\Phi(k)$ may indicate the selected scanning beam from $\mathcal{B}$ for the time slot k, using a scanning beam policy for a particular realization of the receiver station 104. The term $\Phi(k)$ is a function of the scanning beam policy, and the policy itself is omitted from the notation for simplicity.

For a scanning interval of size b, and non-randomized scanning beam and data transmission beam policies, denoted by the combined policy term $\mathcal{P}$, the term $\mathcal{U}(\mathcal{P}, b)$ denotes the set of all data transmission beams that can be chosen by $\mathcal{P}$ for all valid feedback sequences of size b, and $\mathcal{B}(\mathcal{P}, b)$ denotes the set of all scanning beams that can be chosen by $\mathcal{P}$ for all valid feedback sequences of any size, including partial feedback sequences available within the scanning intervals.

For n=$|\mathcal{B}(\mathcal{P}, b)|$ contiguous scanning beams, the beams $\Phi_i$, with i=1, . . . , n, represented by the beam interval [$\phi_{2i-1}$, $\phi_{2i}$), have at most 2n beginning and end points. These points may be represented by a loop $\odot_L[l_1, \ldots, l_n]$. This loop generates 2n angular intervals, counting the interval ith a possible length of zero, denoted by a loop $\odot_I[I(l_1, l_2), I(l_3, l_3), \ldots, I(l_n, l_1)]$, where $I(l_i, l_j)$ denotes an interval from the angle $l_i$ to the angle $l_j$ in a counterclockwise direction. Inclusion or exclusion of a singular point, such as the end point of an interval, does not affect the problem.

There is a feedback sequence $s_i$ associated with each interval $v_i$. In particular, for any valid feedback sequence s, there is at least an interval v where the angle of departure lies within the interval. However, there might be more than one interval that corresponds to the same feedback sequence. For example, consider two beams with intervals $I(\phi_1, \phi_2)$ and $I(\phi_3, \phi_4)$, where $\phi_1 < \phi_3 < \phi_4 < \phi_2$. The feedback sequence 11 or 00 corresponds to a single interval $[\phi_3, \phi_4]$ or $[\phi_1, \phi_2]$, respectively. However, the feedback sequence 10 corresponds to two disjoint intervals, $[\phi_1, \phi_3]$ and $[\phi_4, \phi_2]$, and the feedback sequence 01 may be invalid.

An optimal solution to IBA($f$, b, d, $\mathcal{P}$) may be obtained for a maximum rate code with the same parameters. As a result, IBA($f$, b, d, $\mathcal{P}$) may break into two problems, one to find the code with the maximum rate, and another to design the scanning beam and data transmission beam codebooks. By using the results of the code design problem, the optimal number of partitions may be determined for the IBA($f$, b, d, $\mathcal{P}$) problem. This number may be used to design the optimal partitioning of the search space or angular uncertainty region, which directly results in the data transmission beam codebook. Based on the results from the code design problem, each entry of the scanning beam codebook may also be defined as a particular union of some of such partitions, where the indices of the partitions are defined based on the optimal codes. The scanning beam and data transmission beam policies may be derived directly based on the code design.

As noted above, a binary loop may be a loop with binary elements, and may be called unimodal if there is only one position where the value of an element in that position is less than or greater than the value of the immediately preceding element. A binary code of length n may be called d-unimodal, denoted by $\mathcal{W}(b, d)$, if there exists a characteristic loop that includes all codewords in a particular circular order, and if the binary loop of the elements in the $l^{th}$ position (for l>d) of the codewords is unimodal, for any subset of the codes in the loop with the same prefix of length l-d. The code size is the number of codewords of $\mathcal{W}(b, d)$, expressed as $|\mathcal{W}(b, d)|$. The code rate may be defined as ½ log $2|\mathcal{W}(b, d)|$.

The characteristic loop may include repetition of the same element. Thus, a minimal characteristic loop may be one which does not include any consecutive repetition. However, a minimal characteristic loop may include non-consecutive repetitions. For example, if $\mathcal{W}(b, d)=\{11,01,10\}$, a characteristic loop may be 11,01,11,10. For the code $\mathcal{W}(b,$ d), having a maximum code size or maximum code rate, there exists a characteristic loop which has the same number of codewords as the codebook, such that it includes each element of the code exactly once in a particular position in the loop. Thus, any minimal characteristic loop of a $\mathcal{W}$(b, d) code has the length |$\mathcal{W}$(b, d)|. The characteristic loop for a code may not be unique, but, for any d-unimodal code $\mathcal{W}$(b, d), there exists a minimal characteristic loop with length |$\mathcal{W}$(b, d)| that is the size of the code. As a result, the minimal characteristic loop includes every element of the code in only one position of the characteristic loop.

For any code with a characteristic loop $\odot_W$, a loop that includes a prefix of length b–i of all the codewords in the loop is a characteristic loop that defines a parent code of order i. Thus, $\mathcal{W}$(b–i, d). The parent code of order 1 is referred to herein as the parent code. This uses the fact that selecting a subset of code by choosing an arbitrary prefix of all the codewords results in a new characteristic loop. The parent of a code may be unique. However, there may be different codes that have the same parent.

A child node $\mathcal{W}$(b, d) with a minimal characteristic loop $\odot_V$, for a $\mathcal{W}$(b–1, d) code with a minimal characteristic loop $\odot_W[W_1, \ldots, W_n]$ may be generated by appending a 0 or 1 bit to the codewords of $\mathcal{W}$(b–1, d). If b≤d, two different elements $w_i$ and $w_j$ may be selected from $\odot_W$ and both 0 and 1 are may be appended to them. For the elements $w_k$, i<k<j (if j exists), an indicator bit (e.g., 1) may be appended, and for any other elements (if they exist), a zero may be appended. The minimal characteristic loop $\odot_V$ may be composed of these elements, such that they are circularly ordered based on the order of their prefix of length b–1, as in $\odot_W$, and the last bit may be based on the ordering of the bit 0 and 1.

For b>d, the same procedure may be performed as for b≤d, for every set of codewords of $\mathcal{W}$(b–1, d) which have the same prefix of size b–d. For d>1, two different elements may be selected, such that their bits b–d+1 differ, if they exist. Selecting prefixes with different b–d+1 bits helps in the case that there is only one codeword in the subset for which the bit b–d+1 is different from the other codewords in the set. Otherwise, any two different codewords can be selected without the condition that the bit b–d+1 is different between them.

The concept of the parent code and child code can be used to show that the maximum code size of a d-unimodal binary code of length b, for d>1, may be given by $R_d(b)$, characterized by the following recursive equation:

$$R_d(b) = R_d(b-1) + 2R_d(b-d), b > d$$

$$R_d(b) = 2^b, b \leq d$$

The minimal characteristic loop may contain exactly $R_d(b)$ different codewords. For d=1, the maximum code rate may be given by $R_d(b) = 2^b$.

The construction of child codes from a parent code may result in different child codes. However, any maximum rate code may be constructed based on recursive addition of the child code.

The explicit solution to the maximum size of the $\mathcal{W}$(b, d) code, based on the above recurrence formula, may be obtained as follows. A term $w_i$ may be defined as $w_i = [w_{id+1}, w_{id+2}, w_{id+d}]$. The recurrence formula is equivalent to $w_i = V w_{i-1}$, i>0, where $V = 2T_1 + T_2$. The term $T_1$ represents a lower triangular matrix of all ones in non-zero places, and the term $T_2$ represents a matrix that has 1 for all elements in all positions in the column d, with the rest of the elements being zero. The initial condition is given by $w_0$, which may be a column vector [2, 3, . . . , 2d]. Hence, $w_i = V^i w_0$. The maximum size of any code of length b can be determined directly, without computing the maximum rate of all codes up to b when using the recursion.

For the d-unimodal code $\mathcal{W}$(b, d), the code rate $$r_d(b) = \frac{1}{n} \log 2(R_d(b))$$

can be found based on $R_d(b)$ that is the maximum size of the codebook with b-bit codewords. This code rate indicates the growth rate of the resolution of the data transmission beam set, since the number of possible data transmission beams is equal to the size of the codebook. The asymptotic behavior of the code rate for large values of n may be determined as follows. The solution to the homogeneous recursion formula may be determined directly.

For any b, it can be verified that, beside the constant root –1, there is only one more real root, that varies based on the b, for the characteristic function of the recursion and the norm of all other complex roots is smaller than the norm of the non-constant root.

The non-constant and real root of the characteristic polynomial of the recurrence equation for d=2, 3, . . . , 7 is approximately given by 2, 1.6956, 1.5437, 1.4511, 1.3881, 1.4322, which translates to rates of 1, 0.7618, 0.6264, 0.5371, 0.4731, 0.4246, respectively. This means that, for d=2, there is no loss in the coding rate and the rate is equal to the case of d=1, which means that there is no delay in the feedback, and the feedback for all the past scanning beams is received before the transmission of the current scanning beam.

The rate drops sharply for lager values of d. With only d=6, the rate drops below 50% of what can be achieved with no delay. As the delay becomes larger, as the number of beams b grows large, the coding rate drops to zero, which can be seen from the fact that the code size grows as 2b, which grows much more slowly than $2^b$.

For IBA(f, b, d, $\mathcal{P}$), there exists a set of scanning beams $\mathcal{B}$, as well as scanning beam and data transmission beam policies denoted by $\mathcal{P}$, that can generate a loop of angular interval $\odot_I$ if and only if there exists a d-unimodal binary code of length |$\odot_I$|. For the optimal solution for IBA(f, b, d, $\mathcal{P}$), the number of the generated angular interval is maximum. There is a one-to-one correspondence between the existence of IBA(f, b, d, $\mathcal{P}$) and a code $\mathcal{W}$(b, d). In addition, for the optimal IBA(f, b, d, $\mathcal{P}$), the corresponding code $\mathcal{W}$(b, d) has a maximum rate. By using contiguous scanning beams, the data transmission beams may also be contiguous. Thus, extra constraints are not needed to make the data transmission beams contiguous. For an optimal IBA(f, b, d, $\mathcal{P}$) with contiguous scanning beams, the data transmission beam corresponding to the uncertainty region is contiguous.

The process for finding an optimal solution may be broken into two steps. First, based on b and d, a maximum rate d-unimodal binary code may be designed. This code may be used to find the maximum number of the angular interval possible by using contiguous beams in b beam scans, with feedback delay of d time slots. Next, the threshold values of the beginning and the end of the angular intervals may be designed. The code and its associated order in its characteristic loop will imply the scanning beam and data transmission beam policies as well. A property of the optimal $\mathcal{W}$(b, d) code is that any parent of the code is also optimal. The truncated scanning beam policy for any b'≤b for the optimal IBA(f, b, d, $\mathcal{P}$) is the optimal policy for IBA(f, b', d, $\mathcal{P}$) as well.

If the optimal IBA(f, b, d, $\mathcal{P}$) is designed to be used in a system with a scanning interval of b, but stops scanning in a time slot b'<b, then the corresponding data transmission beam that is based on the scanning beams is still optimal, even if the value of b' is known beforehand. The system can use extra scanning beams to further refine the data transmission beam that is found after b scans, such that the extended scans are still optimal. In other words, the scanning beam policy is optimal at each step. One can design a scanning policy for common distributions beforehand and use it in real-time in a dynamic fashion, based on the distributions and a predetermined value of b in each frame.

To design IBA(f, b, d, $\mathcal{P}$), a d-unimodal code $\mathcal{W}$(b, d) may be designed by starting from $\mathcal{W}$(1, d) using 0 and 1. The code $\mathcal{W}$(i, d) may then be recursively determined as a child of $\mathcal{W}$(i−1, d) for i=2, . . . , b. The process of finding a child of a code is not unique, and different child codes may be generated. Any maximum rate code may be generated.

The set of data transmission beams, or an optimal partition, may be determined. Because each $u_k$ may be contiguous, $\mathcal{U}$ may include M contiguous intervals $u_i^* = (x_i^*, x_{i+1}^*]$ that are defined only based on the boundary points $x_i^*$, $i \in [M]$ in a loop, with $x_{M+1}^* = x_1^*$. This simplifies the search for the optimal partition $\{u_k^*\}_{k=1}^M$ to finding the boundary values $x_i^*$, $i \in [M]$ which are solutions to the following optimization:

$$\operatorname*{argmin}_{x_i, i \in [M]} \sum_{i=1}^{M} (x_{i+1} - x_i) \int_{x_i}^{x_{i+1}} f_\Psi(x) dx$$

The codewords may be assigned in a characteristic loop of the code $\mathcal{W}$(b, d) to corresponding positions in the loop of the intervals $(x_i^*, x_{i+1}^*]$. It does not matter how the one-to-one correspondence between these two loops is defined in terms of a single element, but the relative order and direction in the loop should be preserved. The codes corresponding to each interval are the corresponding feedback sequence that leads to the selection of each interval. Hence, for each valid feedback sequence, there would be a corresponding interval. This relation may be used to determine a data transmission beam policy.

The scanning beam may also be determined by looking at the prefix of the codes associated with each interval. For a time slot i<d, the scanning beam corresponds to the union of all elements for which the corresponding bit i is equal to an indicator bit, such as 1. For time slots i≥d, the subset of codes with the prefix of length i−d may be identified that are equal to the received feedback sequence. The corresponding beam for the time slot i may then be the union of all intervals that have this bit equal to the indicator bit. In either case, the union of the partitions may result in a contiguous beam. The indicator bit used may be the same as the indicator bit defined in the generation of a child code. The union of the codes with their $i^{th}$ bit set to the indicator bit defines a single contiguous beam for each subset of the beam with the same preamble of size i−d. The actual value of the indicator bit, whether 0 or 1, is irrelevant, and either fixed value may be selected as the indicator bit.

Figure 4:
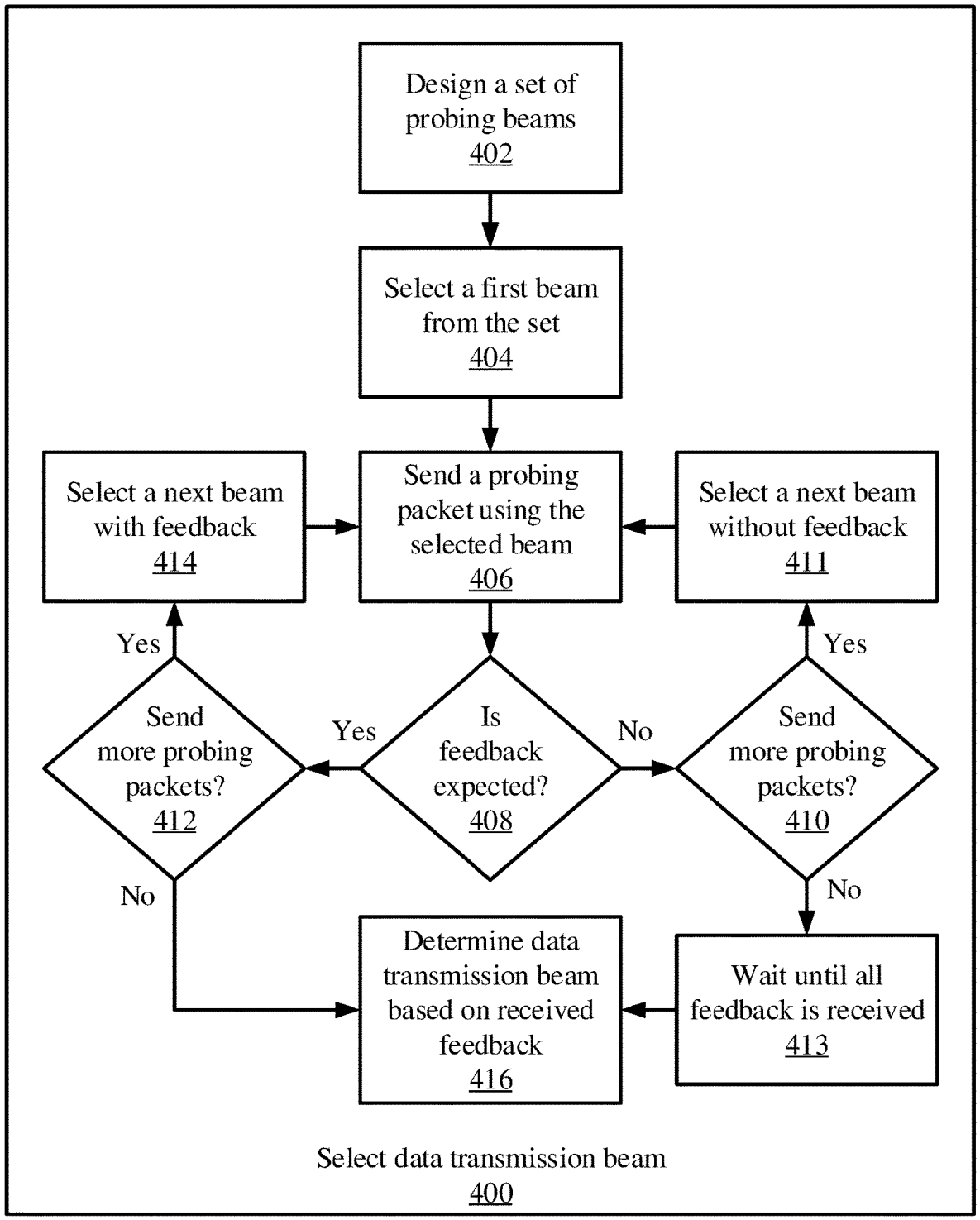
FIG. 4 is a block/flow diagram illustrating a method of selecting a data transmission beam in a system that includes delay in receiving feedback for probing packets, in accordance with an embodiment of the present invention.

Referring now to FIG. 4, a method 400 for selecting data transmission beams is shown. As described in greater detail above, block 402 designs a set of probing beams. For example, these probing beams may represent a set of possible directions in which a base station 102 may transmit using phased array antenna system 101. Block 404 selects a first beam from the set, and block 406 sends a probing packet using the selected beam.

Block 408 determines whether feedback is expected. For example, assuming an expected feedback delay of d, feedback will not be received until at least the $d^{th}$ time interval, as shown in FIG. 2. If feedback is not expected yet, then block 410 determines whether more probing packets are to be sent. This reflects a scenario where all probing packets can be transmitted before the first feedback is received (e.g., b<d). If there are no more probing packets to send, block 413 waits until all pending feedback is received, and a data transmission beam is determined on the basis of the feedback at block 416. If there are more probing packets to send, then block 411 selects a next beam from the set, without the benefit of feedback, and a new probing packet is transmitted at block 406.

If block 408 determines that feedback is expected at this point, for example at times after the delay d, then block 412 determines whether there are more probing packets to send. If not, then block 416 determines the data transmission beam on the basis of the feedback. If there are more probing packets to send, then block 414 selects a next beam from the set, using the feedback to help make the determination. Block 406 then sends a probing packet using the selected beam.

As described in detail above, the "feedback" may be a received acknowledgement or negative acknowledgement packet that is transmitted by the receiving station 104 in response to a probing packet. The feedback may also include a determination that no acknowledgement was received during the expected delay period. In this event, the lack of acknowledgement may be treated as a negative acknowledgement, for the purposes of selecting a next beam and for determining the data transmission beam.

Figure 5:
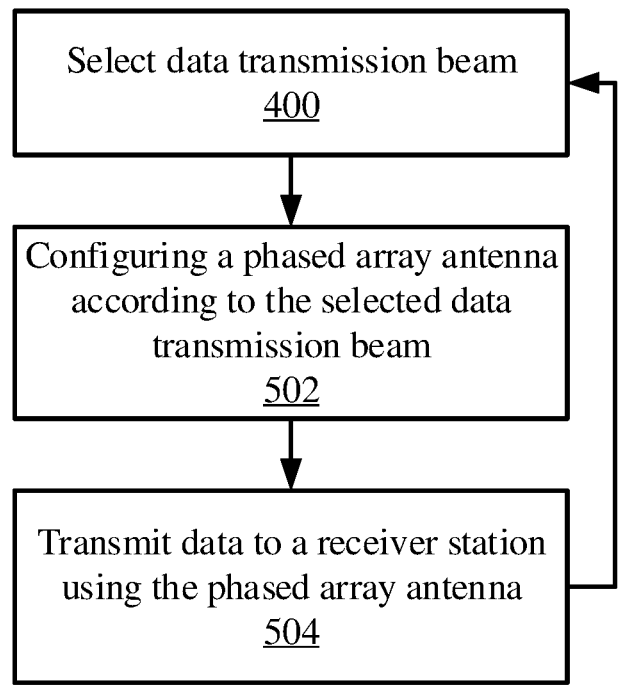
FIG. 5 is a block/flow diagram of a method of performing beam alignment and data transmission during a coherence interval, in accordance with an embodiment of the present invention.

Referring now to FIG. 5, a method of transmitting data from a base station 102 to a receiver station 104 is shown. Block 400 selects a data transmission beam, for example according to one of the processes described above. It should be noted that any number of such beams may be calculated, to transmit to any number of respective receiving stations.

Block 502 then configures the phased array antenna 101 according to the selected data transmission pattern. This configuration may include, for example, setting a phase shift and amplitude for each of a set of radio front ends that make up the phased array antenna 101, such that transmissions from the various radio front ends interfere constructively and destructively to create a focused beam of transmitted energy that is directed to the receiver station 104.

Block 504 transmits data from the base station 102 to the receiver station 104. This transmission may occur for T−b−d time intervals, as shown in FIG. 2, representing the remaining time of the coherence interval 202 after performing beam alignment. At the end of the coherence interval 202, processing may return to block 400, so that a new transmission beam may be selected.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
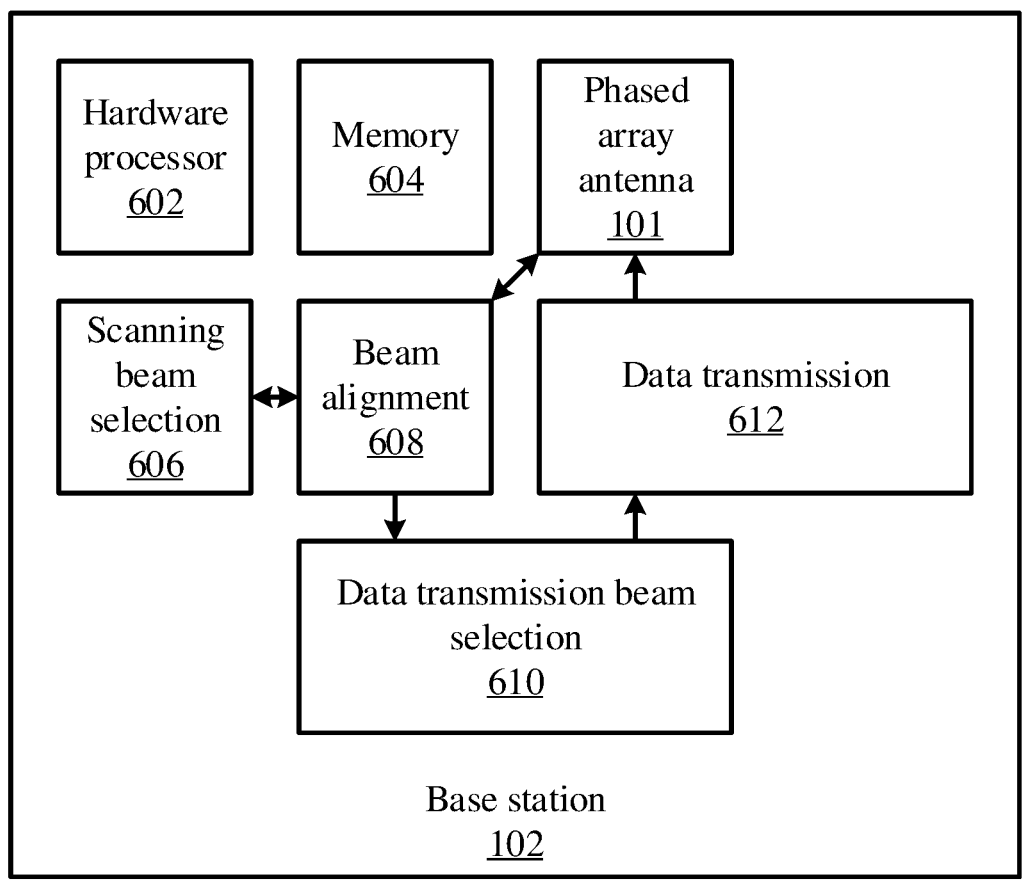
FIG. 6 is a block diagram of a base station that performs beam alignment, with probing packets having an associated delay, in accordance with an embodiment of the present invention.

Referring now to FIG. 6, additional detail on the base station 102 is shown. The base station 102 includes a hardware processor 602 and a memory 604. The base station 102 may include several functional modules, each of which may be implemented as software that is stored in the memory 604 and that is executed by the hardware processor, to perform its respective function. One or more of the functional modules may alternatively be implemented as discrete hardware components, such as with ASICs or FPGAs.

A phased array antenna 101 is used by the base station 102 to communicate with the receiver station 104. Beam alignment 608 uses scanning beam selection 606 to select a sequence of scanning beams, for use by the phased array antenna 101, to transmit probing packets during a beam alignment portion of a coherence interval 202. This beam alignment 608 may make use of feedback received by the phased array antenna 101 to guide further scanning beam selection 606, as such feedback is received following a delay interval.

Once the beam alignment 608 is complete, data transmission beam selection 610 is performed, using any feedback that was received from the probing packets. The selected data transmission beam is used to configure the phased array antenna 101 during data transmission 612. Data transmission 612 may continue for a remainder of the coherence interval 202. At the end of the coherence interval 202, beam alignment 608 may be performed again to account for any changes in relative position between the base station 102 and the receiver station 104.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for transmitting data, the method comprising:
    sending a first probing packet using a first scanning beam, selected from a set of scanning beams;
    determining feedback about the first probing packet;
    sending a second probing packet using a second scanning beam, selected from the set of scanning beams based on the determined feedback about the first probing packet;
    determining feedback about the second probing packet, wherein the feedback about the first probing packet and the feedback about the second probing packet is received after a delay, characterized by a delay parameter;
    determining a data transmission beam based on the set of scanning beams and the determined feedback about the first probing packet and the second probing packet; and
    transmitting data using an antenna that is configured according to the determined transmission beam.

2. The method of claim 1, wherein each of the scanning beams in the set of scanning beams includes an angular coverage interval that corresponds to a respective single contiguous main lobe from a set of contiguous main lobes.

3. The method of claim 1, wherein the data transmission beam has an angular coverage that includes an intersection of angular coverage intervals of scanning beams with positive feedback and a complement of angular coverage intervals of scanning, beams with negative feedback.

4. The method of claim 1, wherein the feedback about the first probing packet and the feedback about the second probing packet includes a particular time interval and feedback packet information.

5. The method of claim 1, wherein the data transmission beam is a composite beam that covers a plurality of disjoint angular intervals.

6. The method of claim 5, wherein transmitting data includes transmitting with a radiation pattern that includes a lower transmitted power at angles outside the disjoint angular intervals than transmitted power within the disjoint angular intervals.

7. The method of claim I, wherein the set of scanning beams is configured to minimize a measure of size of a coverage interval of the data transmission beam.

8. The method of claim 7, wherein the set of scanning beams is configured based on prior knowledge about a communication channel between the antenna and a receiving station.

9. The method of claim 8, wherein the scanning beams are configured to track changes in the communication channel.

10. The method of claim 1, wherein the feedback about the first probing packet and the feedback about the second probing packet includes attributes of a channel between the antenna and a receiving station,.

11. The method of claim 1, wherein the scanning beams are configured based on the delay parameter and a hierarchy, wherein a dedicated subset of the scanning beams in the hierarchy is used in selecting the scanning beams for a time slot.

12. The method of claim 11, wherein the hierarchy partitions the scanning beams into subsets, such that there is a dedicated subset for each time slot up to the delay parameter, and wherein there is a dedicated subset for each sequence of feedback for time slots after the delay parameter.

13. The method of claim 12, wherein the subsets of scanning beams for time slots less than the delay parameter each consist of a single beam.

14. The method of claim 13, wherein the data transmission beam includes an average coverage interval that corresponds to a single contiguous main lobe.

15. The method of claim 1, wherein deteiuiining feedback about the first probing packet and the second probing packet includes determining whether feedback has been received after a delay interval, setting a first bit responsive to a determination that a positive acknowledgement is received, and setting a second bit responsive to a determination that no acknowledgement is received.

16. A method tier transmitting data, the method comprising:
    sending a plurality of probing packets using respective f,rst scanning beams, selected from a set of scanning beams;
    determining feedback about a first probing packet of the plurality of probing packets after a non-zero delay interval has passed;
    sending a second probing packet using a second scanning beam, selected from the set of scanning beams based on the determined feedback about the first probing packet;
    determining feedback about the second probing packet and a remainder of the plurality of probing packets;
    determining a data transmission beam based on the set of scanning beams and the determined feedback about the first probing packet, the second probing packet, and the remainder of the plurality of probing packets;
    configuring a phased array antenna according to the data transmission beam; and
    transmitting data using the configured phased array antenna.

17. The method of claim 16, wherein determining feedback about the first probing packet and the second probing packet includes determining whether feedback has been received after the delay interval, setting a first bit responsive to a determination that a positive acknowledgement is received, and setting a second bit responsive to a determination that no acknowledgement is received.

18. The method of claim 16, wherein the set of scanning beams is configured based on prior knowledge about a communication channel between the antenna and a receiving station.

19. A method for transmitting data, the method comprising:
- sending a plurality of probing packets using respective first scanning beams, selected from a set of scanning beams;
- determining feedback about a first probing packet of the plurality of probing packets after a non-zero delay interval has passed by determining whether feedback has been received after the delay interval, setting a first bit responsive to a determination that a positive acknowledgement is received, and setting a second bit responsive to a determination that no acknowledgement is received;
- sending a second probing packet using a second scanning beam, selected from the set of scanning beams based on the determined feedback about the first probing packet;
- determining feedback about the second probing packet and a remainder of the plurality of probing packets;
- determining a data transmission beam based on the set of scanning beams and the determined feedback about the first probing packet, the second probing packet. and the remainder of the plurality of probing packets;
- configuring a phased array antenna according to the data transmission beam, wherein the set of scanning beams is configured based on prior knowledge about a communication channel between the phased array antenna and a receiving station; and
- transmitting data using the configured phased array antenna.

* * * * *